Nov. 16, 1937.  B. C. PLACE  2,099,619
SECURING TRIM PANELS
Filed June 12, 1933
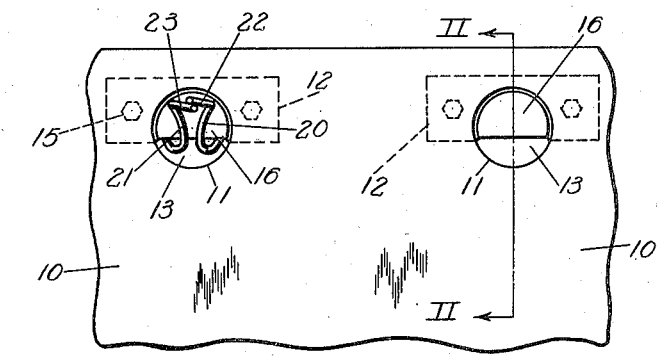
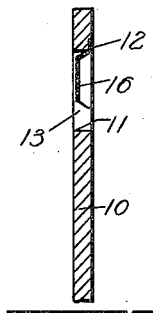
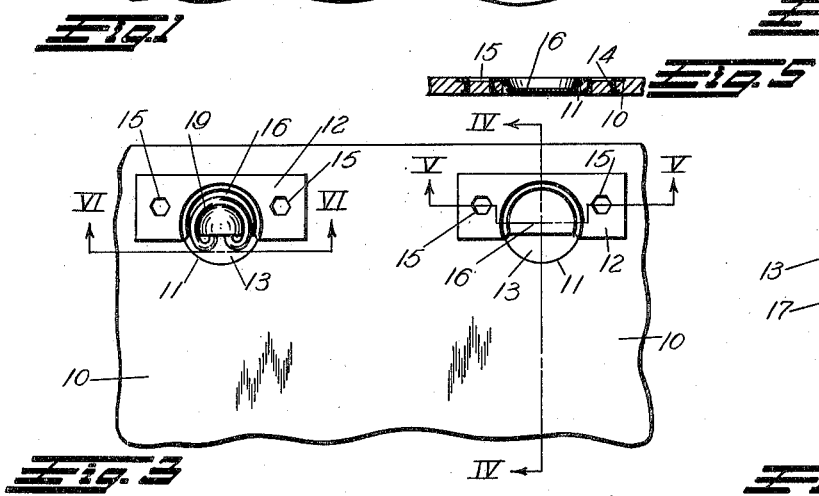
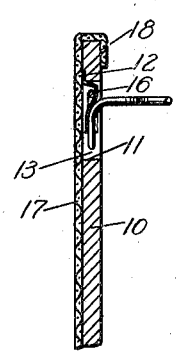
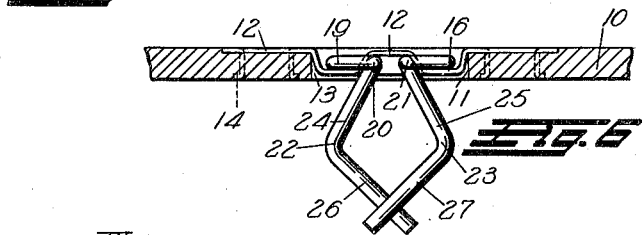
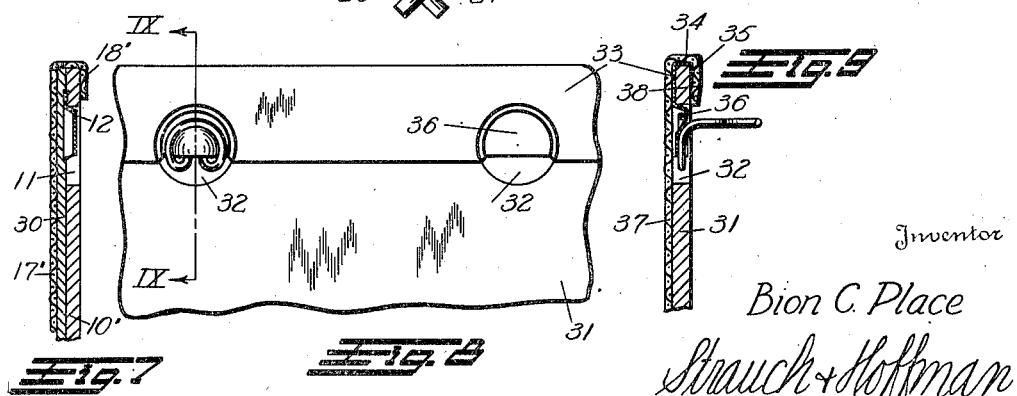
Inventor
Bion C. Place
Strauch + Hoffman
Attorneys Patented Nov. 16, 1937

2,099,619

UNITED STATES PATENT OFFICE 2,099,619

SECURING TRIM PANELS

Bion C. Place, Detroit, Mich., assignor of one-half to George E. Gagnier, Detroit, Mich.

Application June 12, 1933, Serial No. 675,512

9 Claims. (Cl. 45—138)

This invention relates to the securing of trim panels to the interior of automobile or similar bodies. More particularly, the invention relates to an improved way of constructing a trim panel so as to provide an improved arrangement permitting ready assembly of the fasteners with respect to the foundation after the panel had been completely constructed.

In the art of securing trim panels to metal automobile bodies, it is now the practice to assemble the snap fasteners with respect to the panel after the panel has been completely constructed. This requires the formation of openings in the foundation, or the application to the foundation of fastener anchoring means, when separately applied fastener anchoring means are used. Such means, at the points at which they are applied, provide protuberances or projections beyond the surface planes of the foundation, which, when the panel is secured upon the supporting structure, serve to space the panel from said structure or to cause the trim material, that covers one face of the foundation, to sometimes present a visible protuberance or projection in the applied panel, such protuberance or projection being caused in part by the fastener anchoring means and in part by the necessity of providing clearance for the head of the fastener. Some fasteners heretofore proposed for securing automobile or similar trim panels in place have been provided with hook-like heads, parts of which cause the panel to be spaced from the supporting structure, and other parts of which may cause a visible lump or projection in the material that covers the panel.

The primary purpose of the present invention is to provide a trim panel constructed so that flat head fasteners may be used to secure it to the supporting structure and in which the heads of the fasteners as well as the fastener anchoring means can be disposed entirely between the surface planes of the foundation so that the fastener does not provide any projection whatever beyond the inner surface plane to space the panel from the supporting structure, or beyond the outer surface plane to cause a visible hump in the covering material, when no wadding is used between such material and the foundation.

Another object of the invention is to provide a trim panel construction in which use is made of sheet metallic fastener anchoring means associated with the foundation of the panel in such a way as to present a straight edge for the reception of the fasteners, and in which said edge, where the fasteners are to be applied thereto, is disposed in openings in the foundation so that when the fasteners are engaged thereon they will lie entirely between the surface planes of the foundation.

Another object of the invention is to provide an improved way of attaching fasteners to the foundation or trim panel by engaging the fasteners upon thin deformable sheet metallic fastener anchoring members, which are applied between the covering material and the foundation, and which substantially lap fastener receiving openings in the foundation through which the fasteners are assembled with respect to the fastener anchoring means, whereby the pull of the fastener is transmitted to the foundation of the panel directly or substantially independently of the means that is used to secure the sheet metal fastener anchoring means to the foundation.

Another object of the invention is to provide an improved trim panel foundation consisting of a body provided with regularly shaped fastener receiving openings that are partially closed by a thin deformable sheet metallic fastener anchoring element or means depressed in said openings so as to permit the subsequent assembly of flat-head snap fasteners upon said elements or means through said openings in order that the heads of the fasteners may be disposed entirely between the surface planes of the foundation.

A further object of the invention is to provide an improved method of making a trim panel foundation by which fastener anchoring means may be applied thereto with great expedition and a minimum number of operations.

Many other objects of the invention will appear as a description thereof proceeds with reference to the accompanying drawing in which:

Figure 1 is a fragmentary view of the normally uncovered side of a trim panel foundation constructed in accordance with the present invention, a fastener being shown in assembled relation with the foundation through one of the fastener receiving openings therein.

Figure 2 is a sectional view taken on the plane indicated by the line II—II in Figure 1, looking in the direction of the arrows.

Figure 3 is a fragmentary view of the trim panel foundation illustrated in Figure 1, as seen from the other side thereof.

Figure 4 is a sectional view taken on the plane indicated by the line IV—IV in Figure 3, looking in the direction of the arrows, the trim material being shown applied to the panel.

Figure 5 is a fragmentary sectional view taken on the plane indicated by the line V—V in Figure 3.

Figure 6 is a fragmentary sectional view on an enlarged scale, taken on the plane indicated by the line VI—VI, looking in the direction of the arrows.

Figure 7 is a sectional view of a modified construction in which use is made of a thin layer of fibrous or similar material, between the foundation and the covering material to provide a firm and unbroken support for such a covering material at every point thereof.

Figure 8 is a fragmentary view of a modified foundation construction as seen from the normally covered side thereof, in which use is made of an edge binding strip to provide a sheet metallic fastener anchoring means.

Figure 9 is a sectional view taken on the plane indicated by the line IX—IX in Figure 8, the trim material omitted from Figure 8 being shown in Figure 9.

Like reference characters indicate like parts throughout the several views.

Referring first to the form of the invention illustrated in Figures 1 to 6, inclusive, numeral 10 designates a fragment of the foundation of an automobile or similar trim panel. The foundation 10 is constructed of material ordinarily used for this purpose, relatively stiff fiber board, cardboard or the like. The foundation 10, as is customary, is cut to the outline of the surface of the automobile or similar body that it is to cover, and preferably in the same operation of cutting or stamping the panel in proper outline from a sheet of stock, openings 11 are punched therein at all points at which the fasteners are subsequently to be applied to the foundation when the panel, of which it forms a part, is to be applied to a supporting structure. Openings 11 are preferably of regular outline, that is, circular, rectangular or the like, so that they may be formed by inexpensive punches, and said openings are of a size sufficient to freely receive the heads of headed fasteners, presently to be referred to, and to permit the assembly of said fasteners with respect to fastener anchoring means disposed within said openings, and also presently to be referred to.

Fastener anchoring means in the form of retainer plates 12 are secured to the foundation 10 to provide a means to attach the fasteners to the foundation. Plates 12 are preferably rectangular in form so that they may be cut from a strip of material by merely transversely cutting sections therefrom, and said plates are formed of a width so that they partially, but not completely, cover the openings 11 in the foundation, approximately one-half of said openings being covered, providing a passage 13 completely through the foundation for the subsequent assembly of the fastener. The plates 12 are made of a length sufficient to substantially lap the foundation at the sides of the opening 11 therein as illustrated, and the overlapping portions are slitted in any approved manner to provide tongues 14 that may be driven through the fibrous foundation 10 and, preferably, clinched against the opposite side to secure the plates 12 firmly upon the foundation. Preferably, the tongues 14 are provided by bending inwardly the metal of openings 15, formed in the portions of the plate 12 that overlap the foundation, though any other equivalent mode of convenient attachment of the plates may be employed such as by separating tongues from the edges of the plates and driving them through the foundation as illustrated.

In the same operation of applying the plate 12 to the foundation over the openings 11 therein, the overlapping portions are pressed into the foundation so that the plate lies absolutely flush with the surrounding part of the foundation, and the body of said plate is preferably depressed into the openings 11, as indicated by 16, providing a portion of the plate for the subsequent engagement of fasteners that is disposed approximately midway between the surface planes of the foundation 10.

The plates 12 are formed of thin deformable sheet metal, the thickness of which is greatly exaggregate in the drawing in the interest of clearness of illustration. The plates are cut from a strip of sheet steel or zinc having the thickness of an order of .01 of an inch.

When the retainer plates are applied to the foundation and pressed therein, it will be understood that in view of the very thin metal used to make them, that the thickness of the foundation is not increased since it is entirely feasible to press the thin plates completely into a fibrous body having a thickness of the order of .125 inch customarily used in trim panels, even at the points at which the retainer plates lap said foundation, so that no projection beyond the surface plane of the foundation is caused by said plates. Preferably the retainer plates are applied in a single operation, by means of a suitably formed die that cuts the plates from a strip of material, depresses the lapping portions into the foundation and the body thereof within the opening 11, and at the same time causes the teeth 14 to bite into the fibrous material to retain the plates in position, so that the foundations may be constructed with great facility by bringing the various openings therein, which are formed as close to the margin of the foundation as possible, successively beneath the cutting, shaping and applying die so that the plates can be applied without waste of material with the same facility that characterizes stapling or similar operations.

After all of the fastener receiving openings in the foundation have been provided with fastener anchoring means in the form of retainer plates just described, the foundation is ready for the application of the trim material, which material is applied as illustrated in Figure 4 to the face of the foundation upon which the retainer plates 12 have been attached, such trim material being designated by the numeral 17. The trim material is wrapped around the edges of the foundation as designated by 18, in a manner well understood in the art, and it is secured, as by pasting the material to the foundation or in any other desired way. The panel is then ready for the reception of the snap fastener which may be assembled therewith just prior to the application of the panel to the supporting structure of the automobile or like body.

Fasteners of the kind described and claimed in my Patent No. 1,679,266 granted July 29th, 1928, are preferred. Said fasteners, which are each preferably constructed from a single strip of spring wire, comprise a flat head and a shank consisting only of two outwardly bowed legs. The head of the fastener consists of a loop 19 and arms 20 and 21 disposed substantially in the plane of the loop 19. Said arms (Figure 1) carry the legs 22 and 23 respectively, said legs constituting the shank of the fastener. The legs are bent away from the plane of the head into a plane approximately at right angles to the head. The legs 22 and 23 are bowed outwardly between the head of the fastener and the end of the shank, providing divergently disposed holding surfaces or portions 24 and 25 and convergently disposed guiding portions 26 and 27 (Figure 6) for the purpose pointed out in my said patent.

The heads of the fasteners just briefly described, may be assembled with respect to the retainer plate 12 by passing the side of the loop opposite that which carries the arms 20 and 21 through the space 13 to bring this part of the head between the trim material 17 and the side of the retainer plate immediately adjacent thereto. The fastener is then bodily shifted until the arms 20 and 21 engage the other side of the retainer plate 12, and the movement of the fastener is continued until it has been hooked upon the depressed portion of the retainer plate 12 that is disposed within the openings 11 of the foundation 10. Inasmuch as the arms 20 and 21 are disposed substantially in the loop 19 of the head, but spaced therefrom, the straight edge of the retainer plate that is engaged by the fastener is bent or distorted during the application of the fastener to the retainer plate as just described, as illustrated particularly in Figure 6 of the drawing, the soft and thin nature of the metal from which the retainer plates are constructed readily permitting such deformation. As a result a portion of the depressed part of the retainer plate 12 within the opening 11 is beneath the loop part of the head, while another part is above the arms of the head. In view of the relatively wide spacing of the loop and the arms, the relatively slight distortion or curving of the thin retainer plates may very readily be brought about.

When it is desired to apply a trim panel to a supporting structure, each one of the retainer plates is provided with a fastener assembled as just described, and after all of the fasteners have been assembled with respect to the foundation, the panel is ready for application to the supporting structure. It will be understood that the fasteners are firmly held in position after application thereof because in the bending or distortion of the retainer plates, considerable friction is created between the heads of the fastener and the retainer plate, so that there is no liability of the fasteners becoming disengaged from the foundation after assembly therewith. The fasteners having been interlocked with respect to the foundation in the manner just described the panel may be applied by bringing the protruding shanks of the fasteners successively into openings in the supporting structure, which correspond in location to the location of the fasteners upon the foundation. Said shanks are then successively snapped into the openings in the manner more fully described in my patent above referred to.

It will be observed that, in the arrangement just described, the entire head of the fastener, as well as the means used to anchor the fastener to the foundation of the panel is disposed between the surface planes of the foundation, so that there is no protrusion of any part of the head beyond either surface plane. As a result the trim material 17 lies perfectly flat upon the foundation, and upon application of the panel to the supporting structure the fasteners will draw said panel in contact with the supporting structure at every point around the margins thereof so that there is no spacing of the panel from the supporting structure by any part of the fastener.

It will be observed further that the fasteners, exert a pull upon the panel tending to draw it toward the supporting structure, because of the divergent nature of the divergently disposed holding surfaces 24 and 25. Such pull is resisted by the retainer plate and the foundation substantially independently of the tongues 14 that secure the retainer plates to the foundation, the retainer plates being put under tension, but inasmuch as even thin sheet metal possesses a high tensile strength, it will be apparent that the fasteners cannot be pulled from the foundation without drawing the entire plate through the openings 11. It will thus be clear that in view of the fact that the retainer plates are applied between the foundation and the trim material, that they are capable of effectively resisting very substantial forces tending to pull them away from the foundation.

The arrangement just described provides a flat supporting surface for the trim material 17 and said material is unsupported only opposite certain parts of the openings 11 in the foundation. When it is desired to provide a support for the trim material at every point thereof, a thin supplemental foundation 30 of cardboard may be applied between the foundation 10' and the covering material 17' as illustrated in Figure 7 of the drawing. The edge of the covering material 17' may be lapped around the superposed sheets of foundation material as indicated at 18' in said figure. Inasmuch as there is no protrusion of the fastener anchoring means beyond the surface plane of the main foundation 10' of this figure, it will be understood that, as illustrated, the supplemental foundation 30 will lie flatwise against the foundation 10 at all points, providing a firm support for the trim material 17' at every point.

Instead of using separate retainer plates applied as above described, an edge reinforcing strip constructed of thin deformable sheet metal, of the character of which the retainer plates above described are constructed, may be used to serve the function of an edge binder and fastener anchoring means for a foundation 31, provided with openings 32 at the points at which fasteners are to be applied, which openings correspond to the openings 11 in the foundation 10 before referred to.

The edge binder and fastener anchoring means, in this form of the invention, consists of a strip of thin deformable sheet metal material including a wide portion 33 lapping the margins of the foundations 31, another portion 34 lapping the edges of the foundation, and a third portion 35, preferably quite narrow, lapping the opposite sides of the foundation 31 at the edges thereof as illustrated in Figure 9. The part of the portions 33 opposite the openings 32 in the foundation is depressed into said openings as indicated in 36, providing a fastener receiving portion disposed between the surface planes of the foundation 31. In view of the fact that the binder is constructed of very thin material, the thickness of the panel is not materially increased adjacent the edges thereof by virtue of the fact that said binder is applied thereto.

In the use of the invention illustrated in Figures 8 and 9, the fasteners are assembled with respect to the binder by passing them through the openings 32 and engaging or interlocking them with the depressed portions 36 of the portions 33 of said binder, said depressed portions being deformed in the bringing about of an interlock between the flat heads of the fastener and said portions.

If desired in this form of the invention as in that first described, any suitable means may be used between the trim material and the foundation to provide a support for the covering material 37 that covers one side of the foundation and is lapped around the edges thereof as indicated at 38. A supplemental foundation, or any other covering means such as metal covering plates may be used for this purpose.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A trim panel comprising a foundation provided with an opening, trim material covering one side of said foundation, fastener anchoring means having an imperforate body secured to said foundation so as to substantially lap said foundation at said opening, said means being disposed between said material and foundation with the body thereof extending in said opening, and a fastener interlocked with said means through said opening.

2. A trim panel foundation constructed of relatively stiff material in the form of the surface to be covered by the completed panel and provided with openings at the points at which fasteners are to be applied to secure the panel upon a supporting structure, and fastener anchoring means bridging said openings but only partially covering the same, said means being unperforated opposite said openings and lapping the foundation to a substantial degree, and being constructed of sheet metal and extending into said openings so as to provide a fastener engaging portion disposed between the surface planes of said foundation.

3. A trim panel foundation constructed of relatively stiff material in the form of the surface to be covered by the completed panel and provided with openings at the points at which fasteners are to be applied to secure the panel upon a supporting structure, and fastener anchoring plates bridging said openings but only partially covering the same and secured to said foundation by means struck from said plates, said plates being unperforated opposite said openings and bent in said openings and being constructed of thin deformable metal whereby portions of the fasteners to be anchored by said plates may be disposed in said openings.

4. A trim panel foundation and fastener combination, including an opening in the foundation, a thin deformable sheet metal fastener anchoring plate bridging but only partially covering the opening, and a flat-headed fastener having parts of the head spaced apart and interlocked with said plate so as to bring a portion of the plate beneath one of the parts of the head and another portion above another part of said head, said plate being offset in said opening so that the head of the fastener lies substantially entirely between the surface planes of the foundation.

5. A trim panel foundation comprising a fibrous body provided with a regularly shaped opening formed to freely receive the head of a snap fastener, a sheet metal fastener retained plate secured to said foundation adjacent said opening and having the body thereof disposed between the surface planes of said foundation and one edge spaced from the wall of said opening, and said fastener head passed between said edge and wall and lying wholly within said opening and having a part engaging one side of said plate and another part engaging the opposite side thereof.

6. In combination, a trim panel foundation having an opening, a thin readily-deformable retainer plate bridging said opening and secured to said foundation and having the body thereof extending into said opening between the surface planes of said foundation, and a spring fastener having a head consisting of spaced parts engaged on said body so that said spaced parts are disposed on opposite sides thereof, and within said opening and a shank protruding from the side of the foundation other than that to which said plate is applied.

7. In combination, a trim panel foundation having an opening, a thin readily-deformable retainer plate bridging said opening and secured thereto by means struck from said plate and having the body thereof offset into said opening between the surface planes of said foundation, and a wire spring fastener having a head in the form of a loop and arms within said loop in spaced relation thereto but in substantially the plane of said loop engaged with opposite sides of said retainer plate.

8. A trim panel foundation cut to the desired form and provided with alined openings formed to freely permit the passage of the heads of snap fasteners, and fastener retainer plates of rectangular form applied to said foundation so as to cover said openings except for a passage between an edge of each plate and the wall of the opening it covers, the body of said plates being offset in said openings, and tongues struck from said plates and penetrating said foundation to secure the plates thereto.

9. A trim panel ready for application to a supporting structure and having the yieldable shanks of a multiplicity of fasteners protruding from said panel in position to be sprung in openings in a supporting structure, comprising a foundation having an opening for the head of each fastener, sheet metal fastener anchoring plates extending in each opening, the heads of said fasteners detachably having parts engaged with opposite sides of its respective plate through said openings and lying between the surface planes of said foundation, and trim material for one face of said foundation.

BION C. PLACE.